United States Patent
Tsukagoshi

(10) Patent No.: US 10,225,589 B2
(45) Date of Patent: Mar. 5, 2019

(54) TRANSMISSION APPARATUS, TRANSMISSION METHOD, RECEPTION APPARATUS, AND RECEPTION METHOD

(71) Applicant: SONY CORPORATION, Tokyo (JP)

(72) Inventor: Ikuo Tsukagoshi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/543,424

(22) PCT Filed: Feb. 9, 2016

(86) PCT No.: PCT/JP2016/053869
§ 371 (c)(1),
(2) Date: Jul. 13, 2017

(87) PCT Pub. No.: WO2016/132977
PCT Pub. Date: Aug. 25, 2016

(65) Prior Publication Data
US 2018/0007406 A1    Jan. 4, 2018

(30) Foreign Application Priority Data

Feb. 20, 2015 (JP) ................................. 2015-031800

(51) Int. Cl.
*H04N 7/16*  (2011.01)
*H04N 21/236* (2011.01)
(Continued)

(52) U.S. Cl.
CPC ....... *H04N 21/23605* (2013.01); *H04L 69/22* (2013.01); *H04N 21/235* (2013.01);
(Continued)

(58) Field of Classification Search
CPC ........... H04N 21/23605; H04N 21/235; H04N 21/44; H04N 21/4884; H04N 21/8456; H04N 21/854; H04L 69/22
See application file for complete search history.

(56) References Cited

U.S. PATENT DOCUMENTS

2006/0184994 A1* 8/2006 Eyer .................. H04N 21/2335
                                                          725/136
2007/0154176 A1* 7/2007 Elcock ................ G11B 27/105
                                                          386/243
(Continued)

FOREIGN PATENT DOCUMENTS

JP    2008-193203 A    8/2008
JP    2009-165169 A    7/2009
(Continued)

OTHER PUBLICATIONS

International Search Report dated May 10, 2016 in PCT/JP2016/053869 filed Feb. 9, 2016.

*Primary Examiner* — John R Schnurr
(74) *Attorney, Agent, or Firm* — Oblon, McClelland, Maier & Neustadt, L.L.P.

(57) ABSTRACT

Simplifying subtitle display processing in a variable speed reproduction mode on the receiving side is intended.
A video stream formed with a video packet having coded image data in a payload is generated. A subtitle stream formed with a subtitle packet having subtitle information in a payload is generated. A multiplexed stream including the video stream and the subtitle stream is generated and transmitted. In generating the multiplexed stream, the subtitle packet is arranged at a random access position.

12 Claims, 16 Drawing Sheets

(51) Int. Cl.
　　　*H04L 29/06*　　　(2006.01)
　　　*H04N 21/235*　　(2011.01)
　　　*H04N 21/44*　　　(2011.01)
　　　*H04N 21/488*　　(2011.01)
　　　*H04N 21/845*　　(2011.01)
　　　*H04N 21/854*　　(2011.01)
　　　*H04N 21/43*　　　(2011.01)
　　　*H04N 21/434*　　(2011.01)
　　　*H04N 21/472*　　(2011.01)
　　　*H04N 21/8543*　(2011.01)
　　　*H04N 21/8547*　(2011.01)
(52) U.S. Cl.
　　　CPC ... *H04N 21/23614* (2013.01); *H04N 21/4307* (2013.01); *H04N 21/4343* (2013.01); *H04N 21/4348* (2013.01); *H04N 21/44* (2013.01); *H04N 21/47217* (2013.01); *H04N 21/4884* (2013.01); *H04N 21/8456* (2013.01); *H04N 21/854* (2013.01); *H04N 21/8543* (2013.01); *H04N 21/8547* (2013.01)

(56) References Cited

U.S. PATENT DOCUMENTS

| | | | |
|---|---|---|---|
| 2009/0214178 | A1* | 8/2009 | Takahashi ............ G11B 27/10 386/356 |
| 2013/0058628 | A1 | 3/2013 | Sasaki et al. |
| 2017/0180767 | A1* | 6/2017 | Oh ..................... H04N 21/4884 |

FOREIGN PATENT DOCUMENTS

| | | |
|---|---|---|
| JP | 2012-169885 A | 9/2012 |
| WO | 2009/057298 A1 | 5/2009 |

\* cited by examiner

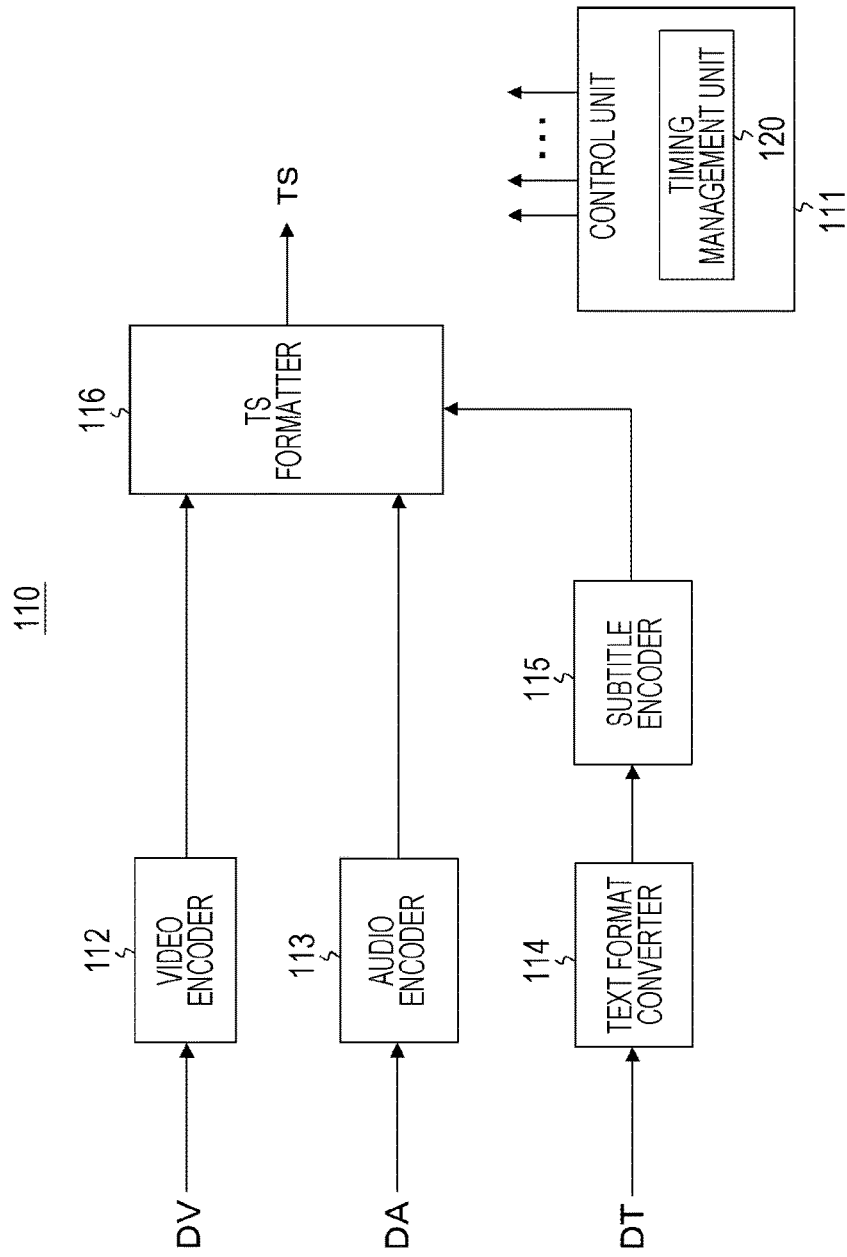

FIG. 3

TTML STRUCTURE

```
<tt xml:lang="" xmlns="http://www.w3.org/ns/ttml">
  <head>
    <metadata/>
    <styling/>
    <layout/>
  </head>
  <body/>
</tt>
```

FIG. 4

TTML Metadata (TTM)

(a)
```
<metadata xmlns:ttm="http://www.w3.org/ns/ttml#metadata">
    <ttm:title>Timed Text TTML Example</ttm:title>
    <ttm:copyright>The Authors (c) 2006</ttm:copyright>
</metadata>
```

TTML Styling (TTS)

(b)
```
<styling xmlns:tts="http://www.w3.org/ns/ttml#styling">
    <!-- s1 specifies default color, font, and text alignment -->
    <style xml:id="s1"
        tts:color="white"
        tts:fontFamily="proportionalSansSerif"
        tts:fontSize="22px"
        tts:textAlign="center"
    />
    <!-- alternative using yellow text but otherwise the same as style s1 -->
    <style xml:id="s2" style="s1" tts:color="yellow"/>
    <!-- a style based on s1 but justified to the right -->
    <style xml:id="s1Right" style="s1" tts:textAlign="end" />
    <!-- a style based on s2 but justified to the left -->
    <style xml:id="s2Left" style="s2" tts:textAlign="start" />
</styling>
```

TTML Layout (region)

(c)
```
<layout xmlns:tts="http://www.w3.org/ns/ttml#styling">
    <region xml:id="subtitleArea"
        style="s1"
        tts:extent="560px 62px"
        tts:padding="5px 3px"
        tts:backgroundColor="black"
        tts:displayAlign="after"
    />
</layout>
```

TTML Body

```
<body region="subtitleArea">
    <div>
        <p xml:id="subtitle1" begin="0.76s" end="3.45s">
        It seems a paradox, does it not,
        </p>
        <p xml:id="subtitle2" begin="5.0s" end="10.0s">
        that the image formed on<br/>
        the Retina should be inverted?
        </p>
        <p xml:id="subtitle3" begin="10.0s" end="16.0s" style="s2">
        It is puzzling, why is it<br/>
        we do not see things upside-down?
        </p>
    </div>
</body>
```

FIG. 9

| Syntax | Size | Type |
|---|---|---|
| if ( PES_extension_flag == '1') { | | |
|    PES_private_data_flag   (=="0") | 1 | bslbf |
|    pack_header_field_flag | 1 | bslbf |
|    program_packet_sequence_counter_flag | 1 | bslbf |
|    P-STD_buffer_flag | 1 | bslbf |
|    PES_extension_negflag_new | 2 | bslbf |
|    reserved | 1 | bslbf |
|    PES_extension_flag_2   (=="1") | | |
|    if ( PES_extension_flag_2 == '1') { | | |
|       marker_bit | 1 | bslbf |
|       PES_extension_field_length (=="12") | 7 | uimsbf |
|       stream_id_extension_flag  (=='1') | 1 | bslbf |
|       reserved | 6 | bslbf |
|       tref_extension_flag   (=>'1') | 1 | bslbf |
| -- CONTINUED TO NEXT PAGE | | |

*FIG. 10*

| Syntax | Size | Type |
|---|---|---|
| CONTINUED FROM PREVIOUS PAGE -- | | |
| if ( !PES_extension_negflag_new ) { | | |
| extension_type | 8 | bslbf |
| if ( extension_type == "1" ) { | | |
| reserved | 4 | bslbf |
| subtitle_start_time[32..30] | 3 | bslbf |
| marker_bit | 1 | bslbf |
| subtitle_start_time[29..15] | 15 | bslbf |
| marker_bit | 1 | bslbf |
| subtitle_start_time[14..0] | 15 | bslbf |
| marker_bit | 1 | bslbf |
| reserved | 4 | bslbf |
| subtitle_end_time[32..30] | 3 | bslbf |
| marker_bit | 1 | bslbf |
| subtitle_end_time[29..15] | 15 | bslbf |
| marker_bit | 1 | bslbf |
| subtitle_end_time[14..0] | 15 | bslbf |
| marker_bit | 1 | bslbf |
| } | | |
| for (i = 0; i < N3; i++) { | | |
| reserved | | |
| } | | |
| } | | |
| } | | |

FIG. 11

PES private data space (stream_id = 0xbd) Syntax

| Syntax | Size | Type |
|---|---|---|
| PES_payload () { | | |
|   private_type | 8 | bslbf |
|   payload_length | 16 | uimsbf |
|   timestamp_insertion_flag | 1 | bslbf |
|   reserved | 7 | bslbf |
|   if (timestamp_insertion_flag ) { | | |
|     reserved | 4 | bslbf |
|     subtitle_start_time[32..30] | 3 | bslbf |
|     marker_bit | 1 | bslbf |
|     subtitle_start_time [29..15] | 15 | bslbf |
|     marker_bit | 1 | bslbf |
|     subtitle_start_time [14..0] | 15 | bslbf |
|     marker_bit | 1 | bslbf |
|     reserved | 4 | bslbf |
|     subtitle_end_time[32..30] | 3 | bslbf |
|     marker_bit | 1 | bslbf |
|     subtitle_end_time [29..15] | 15 | bslbf |
|     marker_bit | 1 | bslbf |
|     subtitle_end_time [14..0] | 15 | bslbf |
|     marker_bit | 1 | bslbf |
|   } | | |
|   coded_data starts ---- | | |
| } | | |

FIG. 12

SEMANTICS OF NEW ELEMENTS

```
PES_extension_negflag_new  (1bit)  INDICATES NEWLY DEFINED DATA ARE ARRANGED IN EXTENSION REGION OF PES header.
    "0"                             NEWLY DEFINED DATA ARE ARRANGED IN EXTENSION REGION OF PES header
    "1"                             NEWLY DEFINED DATA ARE NOT ARRANGED IN EXTENSION REGION OF PES header extension_type  (8bits)  INDICATES TYPE OF NEWLY DEFINED DATA.
    "1"                  INDICATES TIMESTAMP INDICATING SUBTITLE DISPLAY START/END
    others               reserved private_type  (8bits)  INDICATES TYPE OF PRIVATE PES PACKET
    "EC"               INDICATES SUBTITLE STREAM WITH TIMESTAMP timestamp_insertion_flag  (1bit)  INDICATES TIMESTAMP IS ARRANGED AT BEGINNING OF PACKET PAYLOAD.
    "1"                           TIMESTAMP IS ARRANGED
    "0"                           TIMESTAMP IS NOT ARRANGED subtitle_start_time  (33bits)  VALUE OF CAPTION DISPLAY START TIME REPRESENTED IN SYSTEM CLOCK ACCURACY.

subtitle_end_time  (33bits)    VALUE OF CAPTION DISPLAY END TIME REPRESENTED IN SYSTEM CLOCK ACCURACY.
```

| Syntax | Size | Type |
|---|---|---|
| Subtitle_rap_descriptor() { | | |
|   descriptor_tag | 8 | uimsbf |
|   descriptor_length | 8 | uimsbf |
|   subtitle_presentation_time_flag | 1 | bslbf |
|   if ( subtitle_presentation_time_flag ) { | | |
|     time_insertion_type | 2 | bslbf |
|     reserved | 5 | 0x1f |
|   }else{ | | |
|     reserved | 7 | 0x7f |
|   } | | |
| } | | |

(b)

subtitle_presentation_time_flag (1bit)   INDICATES EXISTENCE OF SUBTITLE DISPLAY TIMESTAMP.
    "1"   PERFORMING ARRANGEMENT OF DISPLAY TIMESTAMP UNIQUE TO SUBTITLE
    "0"   NOT PERFORMING ARRANGEMENT OF DISPLAY TIMESTAMP UNIQUE TO SUBTITLE time_insertion_type (2bits)   INDICATES INSERTION TYPE OF DISPLAY TIMESTAMP UNIQUE TO SUBTITLE.
    "01"   INDICATES INSERTION INTO PES header extension
    "10"   INDICATES INSERTION INTO PES payload

TRANSMISSION APPARATUS, TRANSMISSION METHOD, RECEPTION APPARATUS, AND RECEPTION METHOD

TECHNICAL FIELD

The present technology relates to a transmission apparatus, a transmission method, a reception apparatus, and a reception method, and particularly to a transmission apparatus, or the like, that transmits subtitle information together with image data.

BACKGROUND ART

Conventionally, broadcasting such as digital video broadcasting (DVB) includes operation of transmitting subtitle information as bitmap data. In recent years, transmission of the subtitle information in text character codes, that is, transmission on a text basis is proposed. In this case, font development according to the resolution is performed on the receiving side.

Moreover, in a case where subtitle information is transmitted on a text basis, providing the text information with timing information is proposed. As the text information, for example, a timed text markup language (TTML) is suggested by the World Wide Web Consortium (W3C) (refer to Patent Document 1).

CITATION LIST

Patent Document

Patent Document 1: JP 2012-169885 A

SUMMARY OF THE INVENTION

Problems to be Solved by the Invention

An object of the present technology is to simplify subtitle display processing in a variable speed reproduction mode on the receiving side.

Solutions to Problems

A concept of the present technology is a transmission apparatus including: a video encoding unit that generates a video stream formed with a video packet having coded image data in a payload; a subtitle encoding unit that generates a subtitle stream formed with a subtitle packet having subtitle information in a payload; a multiplexed stream generation unit that generates a multiplexed stream including the video stream and the subtitle stream; and a transmission unit that transmits the multiplexed stream. The multiplexed stream generation unit arranges the subtitle packet at a random access position.

In the present technology, a video stream formed with a video packet having coded image data in a payload is generated by the video encoding unit. A subtitle stream formed with a subtitle packet having subtitle information in a payload is generated by the subtitle encoding unit. For example, the subtitle information may be text information of a subtitle of a predetermined format having display timing information. In this case, for example, the text information of the subtitle of the predetermined format may be one of TTML and a derived format of TTML.

A multiplexed stream including at least a video stream and a subtitle stream is generated by the multiplexed stream generation unit. In this case, the subtitle packet is arranged at the random access position. For example, each of the video packet and subtitle packet may be a PES packet, and the multiplexed stream may be an MPEG2 transport stream. A multiplexed stream is transmitted by the transmission unit.

In this manner, the present technology arranges the subtitle packet at the random access position when multiplexing the video stream and the subtitle stream. Therefore, the receiving side can also retrieve the subtitle packet when retrieving the video packet at the random access position from the multiplexed stream, making it possible to simplify the subtitle display processing in the variable speed reproduction mode.

Note that, in the present technology, for example, the subtitle encoding unit may insert a timestamp having a value equal to or close to a value of a timestamp inserted into a timestamp insertion position of a header of the video packet at the random access position, into a timestamp insertion position of a header of the subtitle packet. In this case, when packet multiplexing is performed in the multiplexed stream with reference to the timestamp, the subtitle packet is arranged at the random access position.

Moreover, in the present technology, for example, the subtitle encoding unit may insert a unique timestamp indicating a display time of a subtitle into one of the header and the payload of the subtitle packet. In this case, the receiving side can easily control the display timing of the subtitle on the basis of the unique timestamp.

Moreover, in the present technology, for example, the multiplexed stream generation unit may insert identification information indicating that the unique timestamp has been inserted into the subtitle packet, into the multiplexed stream. In this case, the receiving side can easily recognize that the unique timestamp has been inserted on the basis of the identification information. In this case, for example, information indicating the insertion position may be added to the identification information. In this case, the receiving side can easily obtain the unique timestamp on the basis of the information indicating the insertion position.

Moreover, another concept of the present technology is a reception apparatus including a reception unit that receives a multiplexed stream including a video stream formed with a video packet having coded image data in a payload and including a subtitle stream formed with a subtitle packet having subtitle information in a payload. In the reception apparatus, the subtitle packet is arranged at a random access position in the multiplexed stream. The reception apparatus further includes a processing unit that retrieves the subtitle packet from the multiplexed stream together with the video packet at the random access position and that performs subtitle display processing.

In the present technology, the reception unit receives a multiplexed stream including a video stream formed with a video packet having coded image data in the payload and including a subtitle stream formed with a subtitle packet having subtitle information in the payload. In the multiplexed stream, the subtitle packet is arranged at the random access position. The subtitle packet is retrieved together with the video packet at the random access position from the multiplexed stream by the processing unit, whereby the subtitle display processing is performed.

In this manner, in the present technology, the subtitle packet is arranged at the random access position in the multiplexed stream, and the subtitle packet is retrieved together with the video packet at the random access position from the multiplexed stream, whereby the subtitle display processing is performed. Therefore, it is possible to simplify subtitle display processing in the variable speed reproduction mode.

Note that, it is also allowable in the present technology, for example, such that a first timestamp having a value equal to or close to the value as a value of the timestamp inserted into a timestamp insertion position of a header of the video packet at the random access position, is inserted into the timestamp insertion position of the header of the subtitle packet, and a second timestamp indicating a display time of the subtitle is inserted into one of the header and the payload of the subtitle packet, and such that the processing unit performs, in a normal reproduction mode, subtitle display processing with reference to the second timestamp. In this case, it is possible to easily control the subtitle display timing.

In this case, for example, it is also allowable to configure such that identification information indicating that the second timestamp has been inserted into the subtitle packet is inserted into the multiplexed stream and that the processing unit extracts the second timestamp from the subtitle packet on the basis of the identification information and uses the second timestamp.

Effects of the Invention

According to the present technology, it is possible to simplify subtitle display processing in the variable speed reproduction mode on the receiving side. Note that effects described here in the present specification are provided for purposes of exemplary illustration and are not intended to be limiting. Still other additional effects may also be contemplated.

BRIEF DESCRIPTION OF DRAWINGS

FIG. 2 is a block diagram illustrating an exemplary configuration of a stream generation unit of a broadcast delivery system.

FIG. 3 is a diagram for illustrating a TTML structure.

FIGS. 4(a) to 4(c) are diagrams each illustrating an exemplary structure of each of elements of metadata, styling, and layout, present in a header (head) of the TTML structure.

FIG. 9 is a diagram illustrating an exemplary configuration (1/2) of a "PES extension".

FIG. 10 is a diagram illustrating an exemplary configuration (2/2) of the "PES extension".

FIG. 11 is a diagram illustrating an exemplary configuration of a PES payload (PES_payload) arranged in a region of "PES packet data bytes".

FIG. 12 illustrates the contents of a new element in the exemplary configuration of the PES extension and the PES payload.

FIGS. 13(a) and 13(b) are diagrams illustrating an exemplary structure of a subtitle rap descriptor and main contents of information in the exemplary structure.

MODE FOR CARRYING OUT THE INVENTION

Hereinafter, embodiments of the present invention (hereinafter, embodiment(s)) will be described. Note that description will be presented in the following order.
1. Embodiment
2. Modification example 1. Embodiment

[Exemplary Configuration of Transmission-Reception System]

Figure 1:
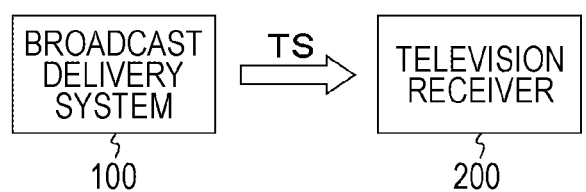
FIG. 1 is a block diagram illustrating an exemplary configuration of a transmission-reception system according to an embodiment.

FIG. 1 illustrates an exemplary configuration of a transmission-reception system 10 according to an embodiment. The transmission-reception system 10 includes a broadcast delivery system 100 and a television receiver 200. The broadcast delivery system 100 transmits a transport stream TS as a multiplexed stream over broadcast waves. The transport stream TS includes a video stream and a subtitle stream. The video stream is formed with a video PES packet having image data in a payload. The subtitle stream is formed with a subtitle PES packet having subtitle (caption) information in the payload.

A timestamp having a value equal to or close to the value of the timestamp inserted into the timestamp insertion position of the header of the video PES packet at the random access position is inserted into the timestamp insertion position of the header of the subtitle PES packet. Moreover, a unique timestamp indicating the display time of the subtitle is inserted into one of the header and the payload of the subtitle PES packet.

When the subtitle stream is multiplexed with the video stream, or the like, a TS packet including the subtitle PES packet (hereinafter simply referred to as a PES packet) is arranged at the random access position. In this case, for example, as described above, the subtitle PES packet is arranged at the random access position, that is, close to the position of the video PES packet at the random access position, with reference to the timestamp inserted into the timestamp insertion position of the header.

Identification information indicating that a unique timestamp has been inserted into the subtitle PES packet is inserted into the transport stream TS. The identification information is inserted, for example, under the program map table. As described above, a unique timestamp is inserted into one of the header and the payload of the subtitle PES packet. Information indicating the insertion position is added to the identification information.

The television receiver 200 receives the transport stream TS sent from the broadcast delivery system 100 over broadcast waves. As described above, the transport stream TS includes at least a video stream and a subtitle stream. Note that the transport stream TS includes an audio stream in some cases. The video stream is formed with a video PES packet having image data in a payload. The subtitle stream is formed with the subtitle PES packet having subtitle information in the payload. Additionally, in multiplexing of the transport stream TS, the subtitle PES packet is arranged at the random access position.

The television receiver 200 retrieves the subtitle PES packet from the transport stream TS together with the video PES packet at the random access position, and performs subtitle (caption) display processing. For example, in the variable speed reproduction mode, the subtitle PES packet retrieved from the random access position of the transport stream TS is immediately processed and the subtitle is displayed.

Moreover, for example, in the normal reproduction mode, the subtitle PES packet retrieved from the random access position of the transport stream TS is processed on the basis of the unique timestamp indicating the display time of the subtitle inserted into one of the header and the payload of the subtitle PES packet, whereby the subtitle is displayed at the display time. In this case, the television receiver 200 extracts the unique timestamp from the subtitle PES packet on the basis of the identification information inserted into the transport stream TS and uses the extracted unique timestamp.

[Exemplary Configuration of Stream Generation Unit of Broadcast Delivery System]

FIG. 2 illustrates an exemplary configuration of the stream generation unit 110 of the broadcast delivery system 100. The stream generation unit 110 includes a control unit 111, a video encoder 112, an audio encoder 113, a text format converter 114, a subtitle encoder 115, and a TS formatter (multiplexer) 116.

The control unit 111 includes a central processing unit (CPU), for example, and controls operation of each of portions of the stream generation unit 110. The video encoder 112 inputs image data DV, codes the image data DV, and generates a video stream (PES stream) formed with a video PES packet having coded image data in the payload. The audio encoder 113 inputs the sound data DA, codes the sound data DA, and generates an audio stream (PES stream) formed with an audio PES packet having coded sound data.

The text format converter 114 inputs text data (character code) DT as subtitle information, and obtains text information of the subtitle of a predetermined format having display timing information. While the text information includes, for example, TTML or a TTML derived format, the embodiment is a case where TTML is used as the text information format.

FIG. 3 illustrates a TTML structure. TTML is described on an XML basis. Each of elements of metadata, styling, and layout exists in the header (head). FIG. 4(a) illustrates an exemplary structure of metadata (TTM: TTML Metadata). The metadata includes metadata title information and copyright information.

FIG. 4(b) illustrates an exemplary structure of styling (TTS: TTML Styling). In addition to the identifier (id), the styling includes information such as color, font (fontFamily), size (fontSize), and alignment (textAlign). FIG. 4(c) illustrates an exemplary structure of the layout (region: TTML layout). In addition to the identifier (id) of the region in which the subtitle is arranged, the layout includes information such as range (extent), offset (padding), background color (backgroundColor), and alignment (displayAlign).

Figures 5, 6:
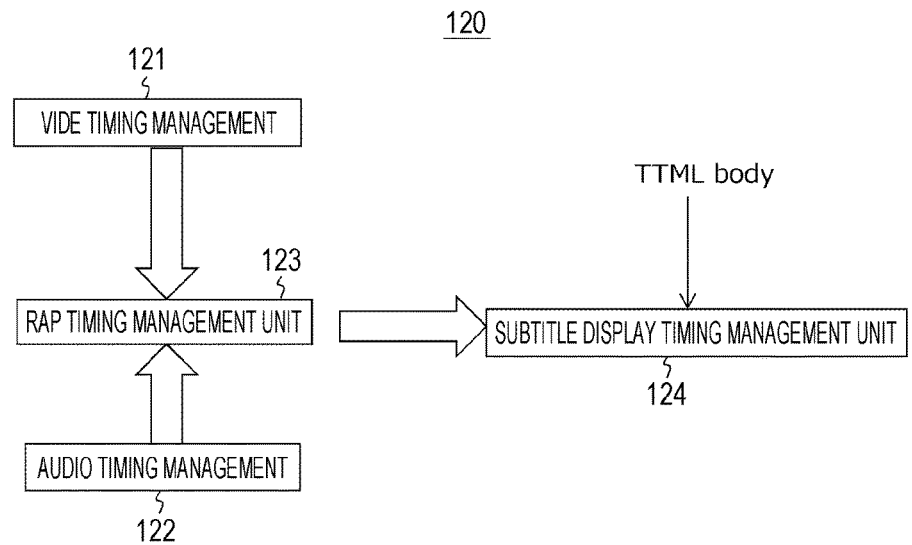
FIG. 5 is a diagram illustrating an exemplary structure of a body of the TTML structure.
FIG. 6 is a diagram schematically illustrating an exemplary configuration of a timing management unit in a control unit.

FIG. 5 illustrates an exemplary structure of the body. The illustrated example includes information indicating three subtitles, that is, subtitle 1, subtitle 2, and subtitle 3. The display start timing and the display end timing, with text data, are described, for each of the subtitles. For example, regarding the subtitle 1, the display start timing is "0.76 s", the display end timing is "3.45 s", and the text data is "It seems a paradox, dose it not".

Returning to FIG. 2, the subtitle encoder 115 converts the TTML obtained by the text format converter 114 into various segments, and generates a subtitle stream (PES stream) formed with the subtitle PES packet arranging these segments (subtitle information) in the payload.

Under the control of the control unit 111, the subtitle encoder 115 inserts a timestamp (first timestamp) having a value equal to or close to the value of the timestamp inserted into a timestamp insertion position of a header of the video PES packet at the random access position, that is, the video PES packet as a target of random access point (RAP), into the timestamp insertion position of the header of the subtitle PES packet.

Note that a head portion of the video PES packet as a target of RAP represents, for example, a head portion of the video PES packet having the coded image data of an intra-picture (I picture) in the payload. In RAP reproduction, the coded image data of the intra-picture included in the video PES packet as the target of RAP are solely decoded from the transport stream TS and displayed as an image.

Moreover, under the control of the control unit 111, the subtitle encoder 115 inserts a unique timestamp (second timestamp) indicating the display time (display start time, display end time) of the subtitle, into one of the header and the payload of the subtitle PES packet.

FIG. 6 schematically illustrates an exemplary configuration of the timing management unit 120 in the control unit 111. The timing management unit 120 includes a video timing management unit 121, an audio timing management unit 122, a RAP timing management unit 123, and a subtitle display timing management unit 124.

The video timing management unit 121 manages the timestamp (timestamp of the video access unit) to be inserted into the timestamp insertion position of each of the video PES packets. The video encoder 112 inserts a timestamp into the timestamp insertion position of each of the video PES packets on the basis of the management information of the video timing management unit 121.

The audio timing management unit 122 manages the timestamp (timestamp of the audio access unit) to be inserted into the timestamp insertion position of each of the audio PES packets. The audio encoder 113 inserts a timestamp into the timestamp insertion position of each of the audio PES packets on the basis of the management information of the audio timing management unit 122.

The RAP timing management unit 123 manages the timestamp of the video PES packet as the target of RAP and also manages the audio PES packet to be the target of RAP among the audio PES packets. In this case, the audio PES packet having a timestamp close to the timestamp of the video PES packet as the target of RAP is handled as a target to be reproduced at the time of RAP.

On the basis of the management information of the audio PES packet as the target of PAP, the TS formatter 116 arranges, as described later, the audio PES packet as the target of RAP at the random access position, that is, the position close to the position of the video PES packet as the target of RAP.

The subtitle display timing management unit 124 manages a first timestamp (timestamp inserted into the timestamp insertion region of the header) and a second timestamp (unique timestamp indicating subtitle display time, inserted into one of the header and the payload) of the subtitle PES packet. The subtitle encoder 115 inserts the first timestamp and the second timestamp into the subtitle PES packet on the basis of the management information of the subtitle display timing management unit 124.

Figure 7:
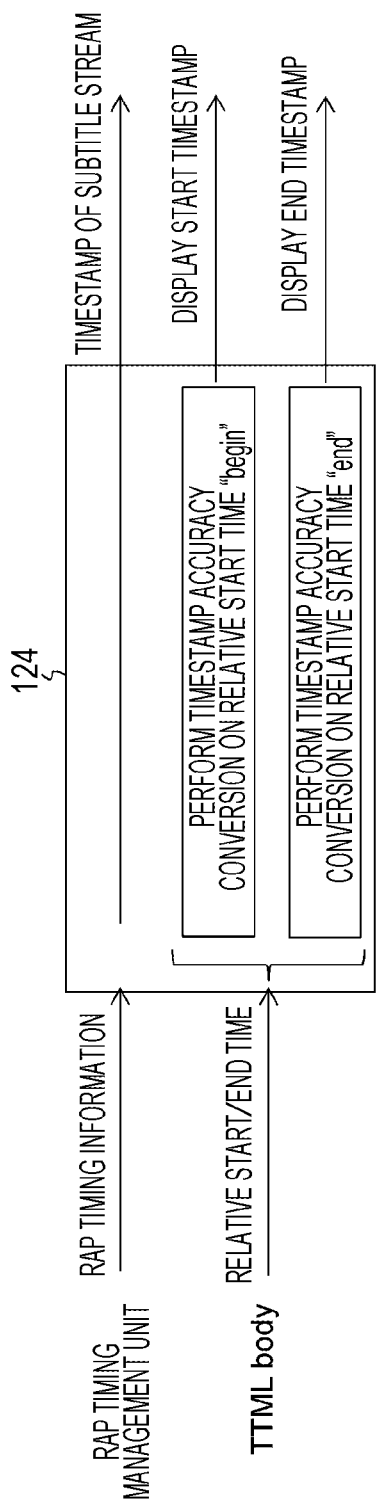
FIG. 7 is a diagram for illustrating a detailed configuration of a subtitle display timing management unit.

FIG. 7 illustrates a detailed configuration of the subtitle display timing management unit 124. The subtitle display timing management unit 124 obtains the first timestamp (timestamp of the subtitle stream) on the basis of RAP timing information obtained from the RAP timing management unit 123. Moreover, the subtitle display timing management unit 124 performs timestamp accuracy conversion on the relative start time "begin" and the relative end time "end" included in the TTML body and obtains the second timestamp (display start timestamp and display end timestamp).

Note that, as illustrated in FIG. 5, in a case where the display timings of a plurality of regions are mutually different, timestamp accuracy conversion is performed on the relative start time "begin" and the relative end time "end" of the region at the earliest timing, and the display start timestamp and the display end timestamp as the second timestamp are obtained.

In this case, the display start timestamp and the display end timestamp as the second timestamp are used for the display control of the earliest region, on the receiving side. Moreover, for the display control of the subsequent region, display timestamps (display start timestamp and display end timestamp) that undergoes timestamp accuracy conversion on the basis of a difference from the relative time of the earliest region supplied by the TTML body are generated and used.

"Insertion position of second timestamp (unique timestamp)"

Figure 8:
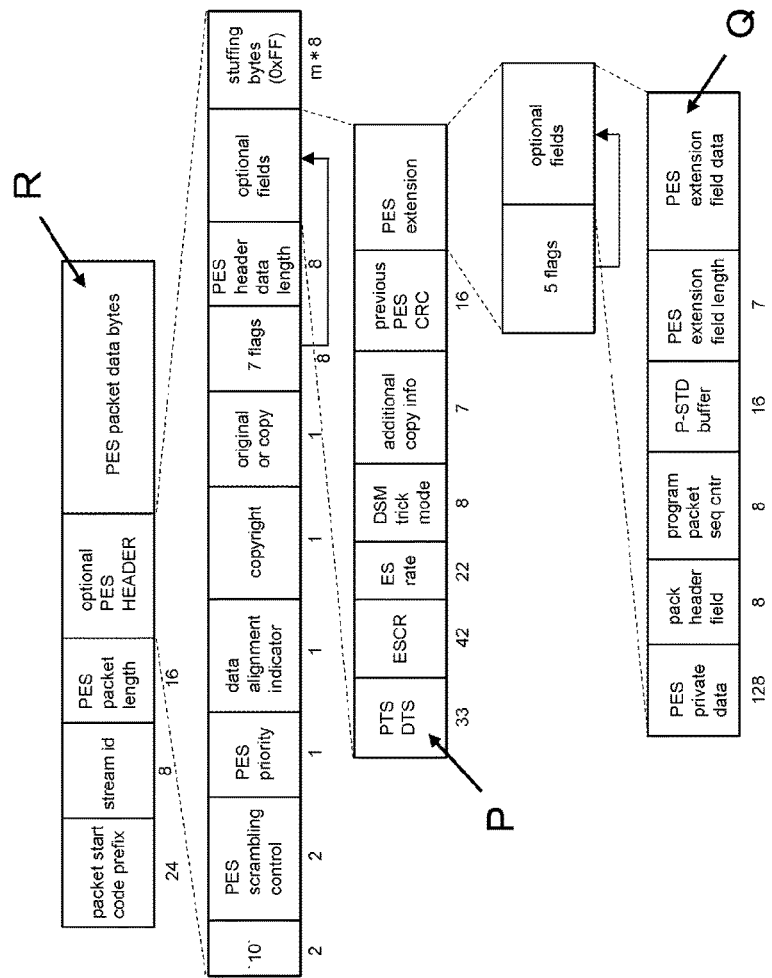
FIG. 8 is a diagram illustrating an exemplary configuration of a PES packet.

Now, a specific example of the insertion position of the second timestamp (unique timestamp) will be described. FIG. 8 illustrates an exemplary configuration (Syntax) of the PES packet. The first timestamp is inserted into a 33-bit region, that is, a timestamp insertion region of the header indicated by arrow P. The timestamp insertion region exists in "optional fields" under "optional PES HEADER" that constitutes the header.

The second timestamp is inserted into one of the header and the payload as described above. In the case of inserting into the header, the second timestamp is inserted into the region of "PES extension fields data" indicated by arrow Q, for example. The "PES extension fields data" exist in "optional fields" under "PES extension". Note that "PES extension" exists in "optional fields" under "optional PES HEADER" that constitutes the header. In contrast, in the case of inserting into the payload, the second timestamp is inserted into the region of "PES packet data bytes" indicated by arrow R.

FIGS. 9 and 10 illustrate an exemplary configuration (Syntax) of the "PES extension". FIG. 11 illustrates an exemplary configuration (Syntax) of the PES payload (PES_payload) arranged in the region of "PES packet data bytes". FIG. 12 illustrates the contents (Semantics) of the new elements in each of the exemplary configurations.

First, an exemplary configuration of the PES extension illustrated in FIGS. 9 and 10 will be described. As flag information, flag information of "PES_extension_negflag_new" is newly defined. The flag information indicates that newly defined data are arranged in the extension region (PES extension) of the PES header. "0" indicates that newly defined data are arranged in the extension region of the PES header. "1" indicates that newly defined data are not arranged in the extension region of the PES header.

When "PES_extension_negflag_new" is "0", this represents that an 8-bit field of "extension_type" exists. This field indicates the type of newly defined data. "1" indicates that it is a timestamp indicating the start and end of display of the subtitle. When "extension_type" is "1", this represents that a 33-bit field of "subtitle_start_time" and a 33-bit field of "subtitle_end_time" exist.

The 33-bit field of "subtitle_start_time" indicates a value (display start timestamp) representing the start time of the subtitle display in clock accuracy of the system. The 33-bit field of "subtitle_end_time" indicates a value (display end timestamp) representing the end time of the subtitle display in clock accuracy of the system.

Next, an exemplary configuration of the PES payload (PES_payload) illustrated in FIG. 11 will be described. The subtitle PES packet is defined as a private PES packet. In the case of the private PES packet, since "PES packet data bytes" can be freely defined, a timestamp indicating start and end of display is inserted into a portion of the private PES packet.

The 8-bit field of "private_type" indicates the type of the private PES packet. "EC" indicates that it is a subtitle stream with a timestamp. The flag information of "timestamp_insertion_flag" indicates that a timestamp is arranged at the beginning of the packet payload. "1" indicates that the timestamp is arranged. "0" indicates that the timestamp is not arranged. When "timestamp_insertion_flag" is "1", this represents that a 33-bit field of "subtitle_start_time" and a 33-bit field of "subtitle_end_time" exist.

Returning to FIG. 2, the TS formatter 116 packetizes the video stream generated by the video encoder 112, the audio stream generated by the audio encoder 113, and the subtitle stream generated by the subtitle encoder 115, into a transport packet and multiplexes the packetized streams, thereby obtaining a transport stream TS as a multiplexed stream.

When each of the streams is multiplexed in this manner, the TS formatter 116 arranges the subtitle PES packet at the random access position, that is, the position close to the position of the video PES packet as a target of RAP, on the basis of the first timestamp (timestamp inserted into the timestamp insertion position of the header). Moreover, at this time, on the basis of the management information of the audio PES packet as the target of RAP, the TS formatter 116 arranges the audio PES packet as the target of RAP at a random access position, that is, the position close to the position of the video PES packet as the target of RAP.

Moreover, the TS formatter 116 inserts, into the transport stream TS, identification information indicating that the second timestamp (unique timestamp indicating the subtitle display time) has been inserted into the subtitle PES packet. In the present embodiment, the TS formatter 116 inserts a subtitle rap descriptor (Subtitle_rap_descriptor) into a subtitle elementary stream loop corresponding to a subtitle stream under the program map table (PMT).

FIG. 13(*a*) illustrates an exemplary structure (Syntax) of the subtitle rap descriptor. FIG. 13(*b*) illustrates the contents (Semantics) of the main information in the exemplary structure. The 8-bit field of "descriptor_tag" indicates the descriptor type, specifically indicates herein that this is a subtitle rap descriptor. The 8-bit field of "descriptor_length" indicates the length (size) of the descriptor and indicates the subsequent byte length as the length of the descriptor.

The flag information of "subtitle_presentation_time_flag" indicates whether subtitle display is performed at a timing different from the conventional timestamp (first timestamp), mainly at the delayed timing, that is, whether there is a display timestamp arrangement unique to the subtitle. "1" indicates that delay display (arrangement of display timestamp unique to the subtitle) is performed. "0" indicates that delay display (arrangement of display timestamp unique to the subtitle) is not performed.

When "subtitle_presentation_time_flag" is "1", this represents that a 2-bit field of "time_insertion_type" exists. This field indicates the insertion type of the display timestamp unique to the subtitle, that is, where the timestamp is inserted. "01" indicates insertion into the PES header extension portion. "10" indicates insertion into the PES private stream payload.

Figure 14:
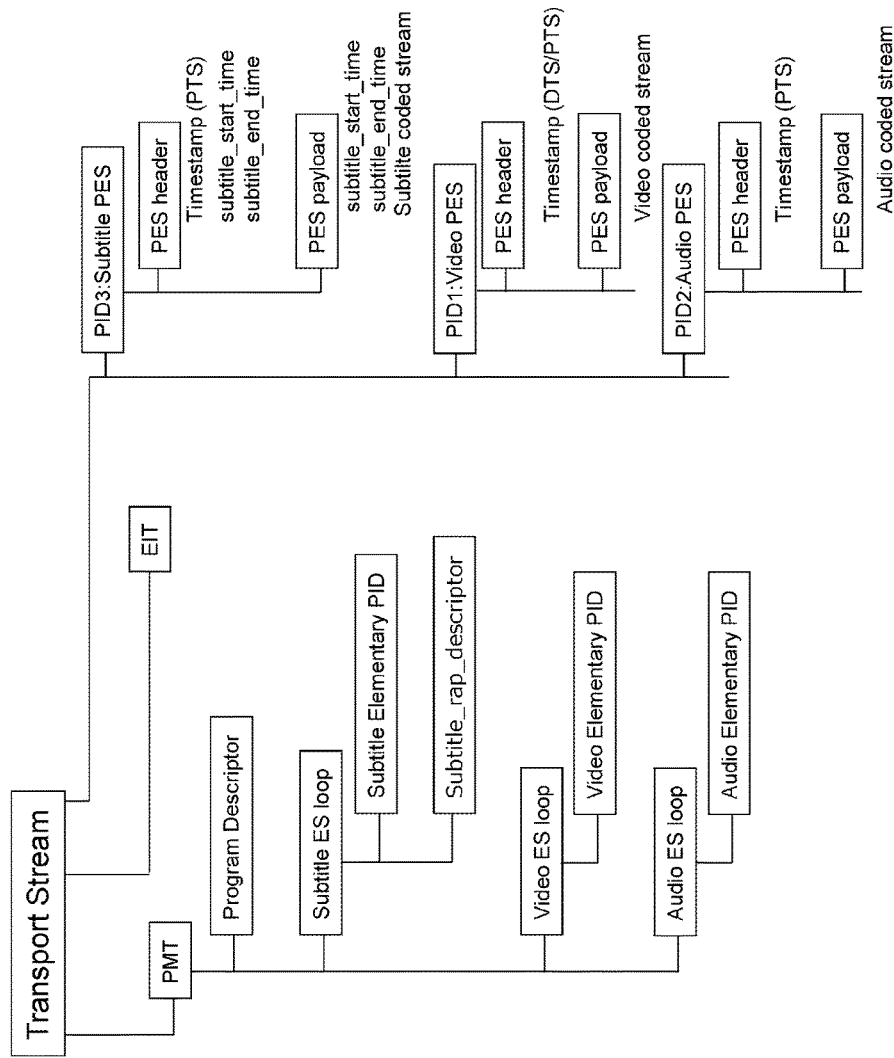
FIG. 14 is a diagram illustrating an exemplary configuration of a transport stream TS.

FIG. 14 illustrates an exemplary configuration of the transport stream TS. In this exemplary configuration, a video PES packet "Video PES", that is, a PES packet of the video stream identified by PID 1 exists. Moreover, in this exemplary configuration, an audio PES packet "Audio PES", that is, a PES packet of the audio stream identified by PID 2 exists. Moreover, in this exemplary configuration, a subtitle PES packet "Subtitle PES", that is, a PES packet of the subtitle stream identified by PID 3 exists.

The PES packet is formed with a PES header and a PES payload. In the video PES packet, a timestamp of DTS/PTS is inserted into the PES header, and a video coded stream (coded image data) is inserted into the PES payload. Moreover, in the audio PES packet, a timestamp of PTS is inserted into the PES header, and an audio coded stream (coded sound data) is inserted into the PES payload.

Moreover, in the subtitle PES packet, a PTS timestamp (first timestamp) is inserted into the PES header, and a subtitle coded stream (a plurality of subtitle segments as subtitle information) is inserted into the PES payload. Moreover, the display start timestamp "subtitle_start_time" and the display end timestamp "subtitle_end_time" as the second timestamp (unique timestamp) exist in one of the PES header and the PES payload.

Moreover, the transport stream TS includes a program map table (PMT) as program specific information (PSI). The PSI is information describing each of elementary streams included in the transport stream TS belongs to which program. Moreover, the transport stream TS includes an event information table (EIT) as serviced information (SI) for performing management for each of the events. The EIT includes description of metadata for each of the programs.

A program descriptor that describes information related to the entire program exits in the PMT. Moreover, an elementary stream loop having information related to each of the elementary streams also exists in the PMT. A video elementary stream loop (Video ES loop), an audio elementary stream loop (Audio ES loop), and a subtitle elementary stream loop (Subtitle ES loop) exist in this exemplary configuration.

Information such as a packet identifier (PID) is arranged in each of the loops, and a descriptor that describes information related to the elementary stream is also arranged in each of the loops. The above-described subtitle rap descriptor (Subtitle_rap_descriptor) is arranged in the subtitle elementary stream loop, as one of the descriptors.

Operation of the stream generation unit 110 illustrated in FIG. 2 will be briefly described. The image data DV is supplied to the video encoder 112. The video encoder 112 codes the image data DV and generates a video stream (PES stream) formed with the video PES packet having coded image data in the payload. This video stream is supplied to the TS formatter 116.

Moreover, the sound data DA is supplied to the audio encoder 113. The audio encoder 113 codes the sound data DA and generates an audio stream (PES stream) formed with an audio PES packet having coded sound data. This audio stream is supplied to the TS formatter 116.

Moreover, the text data (character code) DT as subtitle information is supplied to the text format converter 114. The text format converter 114 obtains text information of a subtitle of a predetermined format having display timing information, namely, TTML, in this exemplary case. The TTML is supplied to the subtitle encoder 115.

The subtitle encoder 115 converts the TTML into various segments and generates a subtitle stream formed with the subtitle PES packet in each of which these segments are arranged in the payload. This subtitle stream is supplied to the TS formatter 116.

At generation of the subtitle stream, the subtitle encoder 115 inserts, under the control of the control unit 111, a timestamp (first timestamp) having a value equal to or close to the value of the timestamp inserted into a timestamp insertion position of a header of the video PES packet as a RAP target, into the timestamp insertion position of the header of the subtitle PES packet.

Moreover, at generation of the subtitle stream, the subtitle encoder 115 inserts, under the control of the control unit 111, a unique timestamp (second timestamp) indicating the display time (display start time, display end time) of the subtitle, into one of the header and the payload of the subtitle PES packet.

The TS formatter 116 packetizes the video stream generated by the video encoder 112, the audio stream generated by the audio encoder 113, and the subtitle stream generated by the subtitle encoder 115, into a transport packet and multiplexes the packetized streams, thereby generating the transport stream TS as a multiplexed stream.

When each of the streams is multiplexed in this manner, the subtitle PES packet is arranged at the random access position, that is, a position close to the position of the video PES packet as a RAP target on the basis of the first timestamp (timestamp inserted into the timestamp insertion position of the header) under the control of the control unit 111.

Moreover, at this time, under the control of the control unit 111, the audio PES packet as the target of RAP is arranged at the random access position, that is, the position close to the position of the video PES packet as the target of RAP on the basis of the management information of the audio PES packet as the target of RAP.

Moreover, the TS formatter 116 inserts identification information into the transport stream TS. The identification information indicates that the second timestamp (unique timestamp indicating display time of the subtitle) has been inserted into the subtitle PES packet. That is, the TS formatter 116 arranges a subtitle rap descriptor (Subtitle_rap_descriptor) in a subtitle elementary stream loop corresponding to the subtitle stream under the program map table (PMT).

[Exemplary Configuration of Television Receiver]

Figure 15:
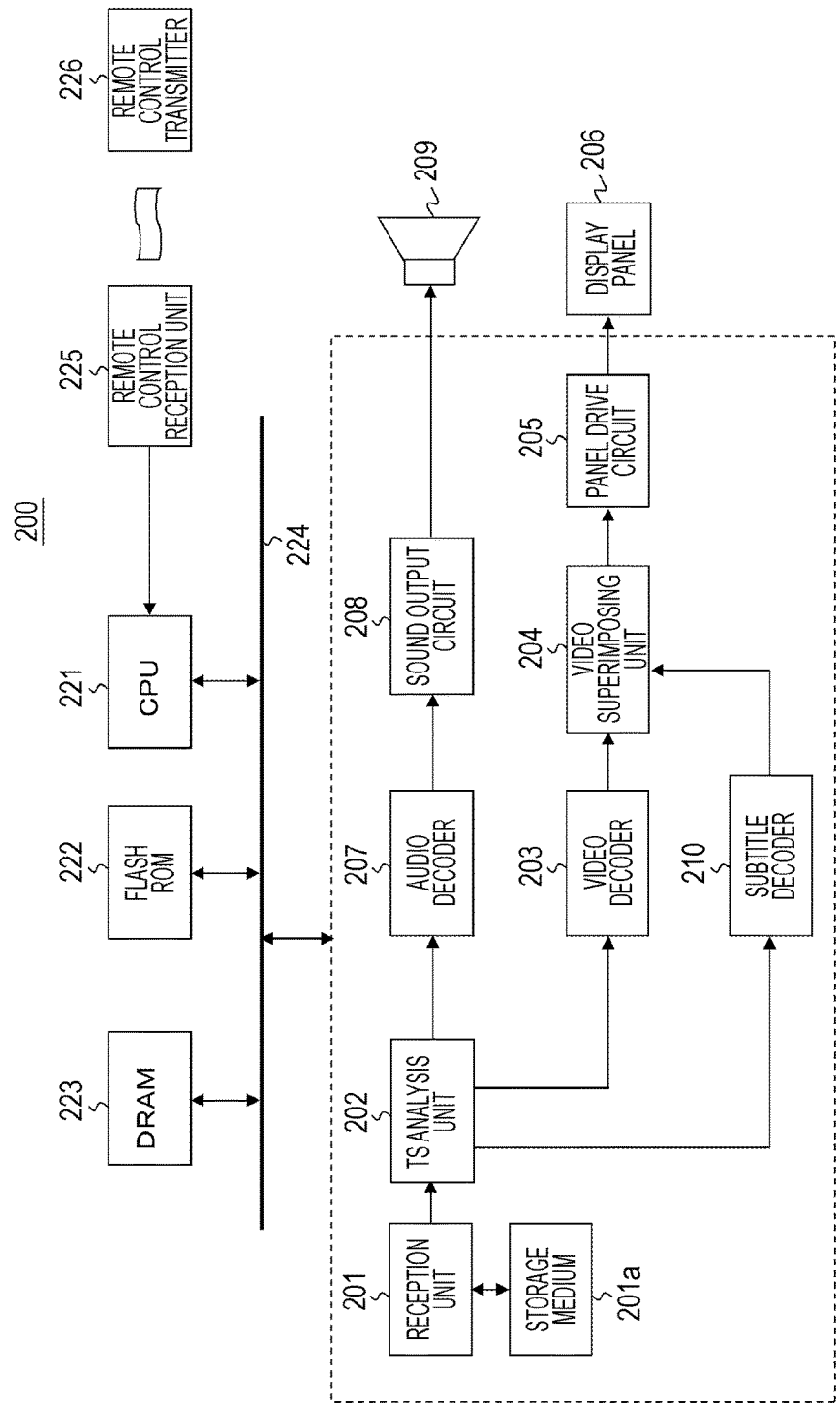
FIG. 15 is a diagram illustrating an exemplary configuration of a television receiver.

FIG. 15 illustrates an exemplary configuration of the television receiver 200. The television receiver 200 includes a reception unit 201, a TS analysis unit (demultiplexer) 202, a video decoder 203, a video superimposing unit 204, a panel drive circuit 205, and a display panel 206. Moreover, the television receiver 200 includes an audio decoder 207, a sound output circuit 208, a speaker 209, and a subtitle decoder 210. Moreover, the television receiver 200 includes a CPU 221, a flash ROM 222, a DRAM 223, an internal bus 224, a remote control reception unit 225, and a remote control transmitter 226.

The CPU 221 controls operation of each of portions of the television receiver 200. The flash ROM 222 stores control software and data. The DRAM 223 constitutes a work area of the CPU 221. The CPU 221 develops the software and data read from the flash ROM 222 onto the DRAM 223 to activate the software, and controls each of portions of the television receiver 200.

The remote control reception unit 225 receives a remote control signal (remote control code) transmitted from the remote control transmitter 226, and supplies the received signal to the CPU 221. The CPU 221 controls each of portions of the television receiver 200 on the basis of this remote control code. The CPU 221, the flash ROM 222, and the DRAM 223 are connected to the internal bus 224.

The reception unit 201 receives the transport stream TS sent from the broadcast delivery system 100 over the broadcast waves. As described above, the transport stream TS includes the video stream, the audio stream, and the subtitle stream. The TS analysis unit 202 extracts the PES packet of each of the video stream, the audio stream, and the subtitle stream, from the transport stream TS.

Note that the transport stream TS received by the reception unit 201 is temporarily stored in a storage medium (buffer or storage) 201a, and a portion corresponding to the reproduction mode is retrieved and sent to the TS analysis unit 202. For example, in the normal reproduction mode, all the stored portions of the stream are sent to the TS analysis unit 202. In contrast, in the variable speed reproduction mode, a partial intermittent portion of the stream corresponding to the double speed, including the RAP position (random access position) is sent to the TS analysis unit 202. Particularly, in the RAP reproduction mode, the portion corresponding to the RAP position (random access position) alone is sent to the TS analysis unit 202.

Moreover, the TS analysis unit 202 extracts various types of information inserted into the transport stream TS, and sends the extracted information to the CPU 221. This information also includes information indicating subtitle rap descriptor (Subtitle_rap_descriptor). With this configuration, the CPU 221 can easily recognize that the second timestamp (unique timestamp) has been inserted into the subtitle PES packet and can easily recognize the insertion position, and can use this recognized information for controlling the subtitle decoder 210.

The audio decoder 207 performs decoding processing on the audio PES packet extracted by the TS analysis unit 202 and then obtains sound data. The sound output circuit 208 performs required processing such as D/A conversion and amplification on the sound data, and supplies the processed data to the speaker 209. The video decoder 203 performs decoding processing on the video PES packet extracted by the TS analysis unit 202 and then obtains image data.

While decoding and output processing for each of the PES packets in the audio decoder 207 and the video decoder 203 is controlled by the timestamp inserted into the header in the normal reproduction mode, the processing is not controlled by the timestamp in the variable speed reproduction mode but is performed immediately after the packet is supplied from the TS analysis unit 202.

The subtitle decoder 210 performs decoding processing on the subtitle PES packet extracted by the TS analysis unit 202 and obtains bitmap data of each of regions to be superimposed on the image data. While the processing of decoding and outputting the subtitle PES packet in the subtitle decoder 210 is controlled by the second timestamp (unique timestamp) inserted into one of the header and the payload in the normal reproduction mode, the processing is not controlled by the second timestamp in the variable speed reproduction mode but is performed immediately after the packet is supplied from the TS analysis unit 202.

Figure 16:
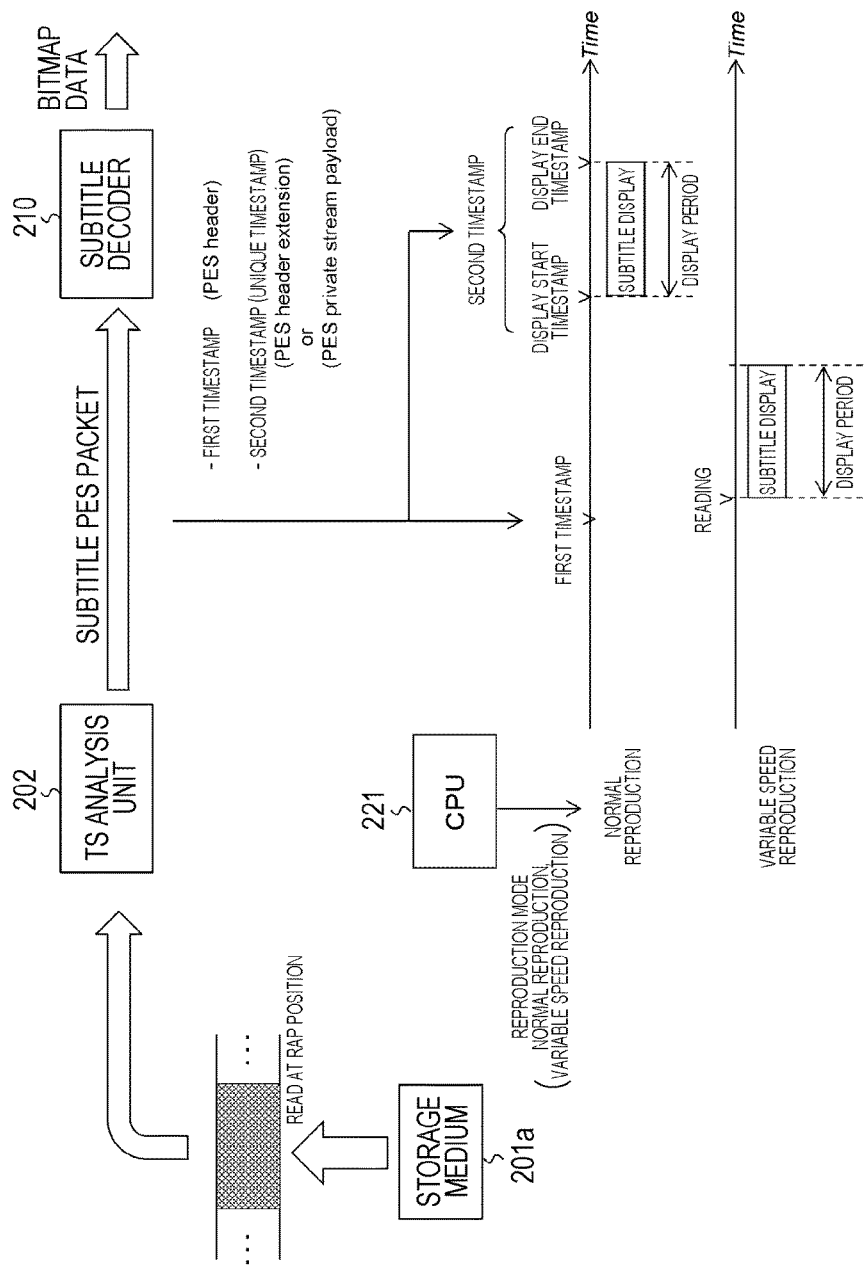
FIG. 16 is a diagram schematically illustrating processing timing of decoding and outputting for a subtitle PES packet read at a random access point (RAP) position.

FIG. 16 schematically illustrates processing timing of decoding and outputting for the subtitle PES packet read at the RAP position, for example. In the case of the normal reproduction mode, decoding is completed by the time indicated by the display start timestamp, the output of the bitmap data as a decoding result is started from the time and continues until the time indicated by the display end timestamp. In this case, the period from the time indicated by the display start timestamp to the time indicated by the display end timestamp is the subtitle display period.

In contrast, in the case of the variable speed reproduction mode, decoding is immediately performed after reading from the storage medium 201a, and output of bitmap data as a decoding result is started. This output duration is the subtitle display period. The output duration is determined depending on the double speed of variable speed reproduction and a subtitle display maintaining function.

Returning to FIG. 15, the video superimposing unit 204 superimposes the bitmap data of each of the regions obtained from the subtitle decoder 210, on the image data obtained by the video decoder 203. The panel drive circuit 205 drives the display panel 206 on the basis of the display image data obtained by the video superimposing unit 204. The display panel 206 includes a liquid crystal display (LCD), an organic electroluminescence (EL) display, for example.

Operation of the television receiver 200 illustrated in FIG. 15 will be briefly described. The reception unit 201 receives the transport stream TS sent from the broadcast delivery system 100 over the broadcast waves. The transport stream TS includes the video stream, the audio stream, and the subtitle stream.

The transport stream TS is supplied to the TS analysis unit 202 via the storage medium 201a. In this case, a portion corresponding to the reproduction mode is retrieved and sent to the TS analysis unit 202. For example, in the normal reproduction mode, all the stored portions of the stream are sent to the TS analysis unit 202. In contrast, in the variable speed reproduction mode, a partial intermittent portion of the stream corresponding to the double speed, including the RAP position (random access position) is sent to the TS analysis unit 202. Particularly, in the RAP reproduction mode, the portion corresponding to the RAP position (random access position) alone is sent to the TS analysis unit 202.

The video PES packet extracted by the TS analysis unit 202 is supplied to the video decoder 203. The video decoder 203 performs decoding processing on the video PES packet extracted by the TS analysis unit 202 and then obtains image data. While decoding and output processing for each of the video PES packets is controlled by the timestamp inserted into the header in the normal reproduction mode, the processing is not controlled by the timestamp in the variable speed reproduction mode but is performed immediately after the packet is supplied from the TS analysis unit 202. The image data are supplied to the video superimposing unit 204.

Moreover, the subtitle stream (PES stream) extracted by the TS analysis unit 202 is supplied to the subtitle decoder 210. The subtitle decoder 210 processes segment data of each of regions and obtains bitmap data of each of the regions to be superimposed on the image data. While the processing of decoding and outputting the subtitle PES packet is controlled by the second timestamp (unique timestamp) inserted into one of the header and the payload in the normal reproduction mode, the processing is not controlled by the second timestamp in the variable speed reproduction mode but is performed immediately after the packet is supplied from the TS analysis unit 202 (refer to FIG. 16).

The bitmap data of each of regions output from subtitle decoder 210 is supplied to the video superimposing unit 204. The video superimposing unit 204 superimposes the bitmap data of each of regions output from the subtitle decoder 210, on the image data obtained by the video decoder 203.

The display image data obtained by the video superimposing unit 204 is supplied to the panel drive circuit 205. The panel drive circuit 205 drives the display panel 206 on the basis of the display video data. As a result, the image on which the subtitle is superimposed is displayed on the display panel 206. In this case, the image is displayed as a normal reproduction image at a normal speed in the normal reproduction mode, while the image is displayed as a variable reproduction image corresponding to the double speed in the variable speed reproduction mode.

Moreover, the audio PES packet extracted by the TS analysis unit 202 is supplied to the audio decoder 207. The audio decoder 207 performs decoding processing on the audio PES packet and then obtains sound data. While decoding and output processing for each of the audio PES packets is controlled by the timestamp inserted into the header in the normal reproduction mode, the processing is not controlled by the timestamp in the variable speed reproduction mode but is performed immediately after the packet is supplied from the TS analysis unit 202.

This sound data is supplied to the sound output circuit 208. The sound output circuit 208 performs necessary processing such as D/A conversion and amplification on the sound data. Then, the processed sound data is supplied to the speaker 209. With this configuration, a sound output corresponding to the display image of the display panel 206 is obtained from the speaker 209.

As described above, in the transmission-reception system 10 illustrated in FIG. 1, the subtitle PES packet is arranged at the random access position in the generation of the transport stream TS as the multiplexed stream on the transmission side. Therefore, the receiving side can also retrieve the subtitle PES packet when retrieving the video PES packet at the random access position from the multiplexed stream, making it possible to simplify the subtitle display processing in the variable speed reproduction mode.

Figure 17:
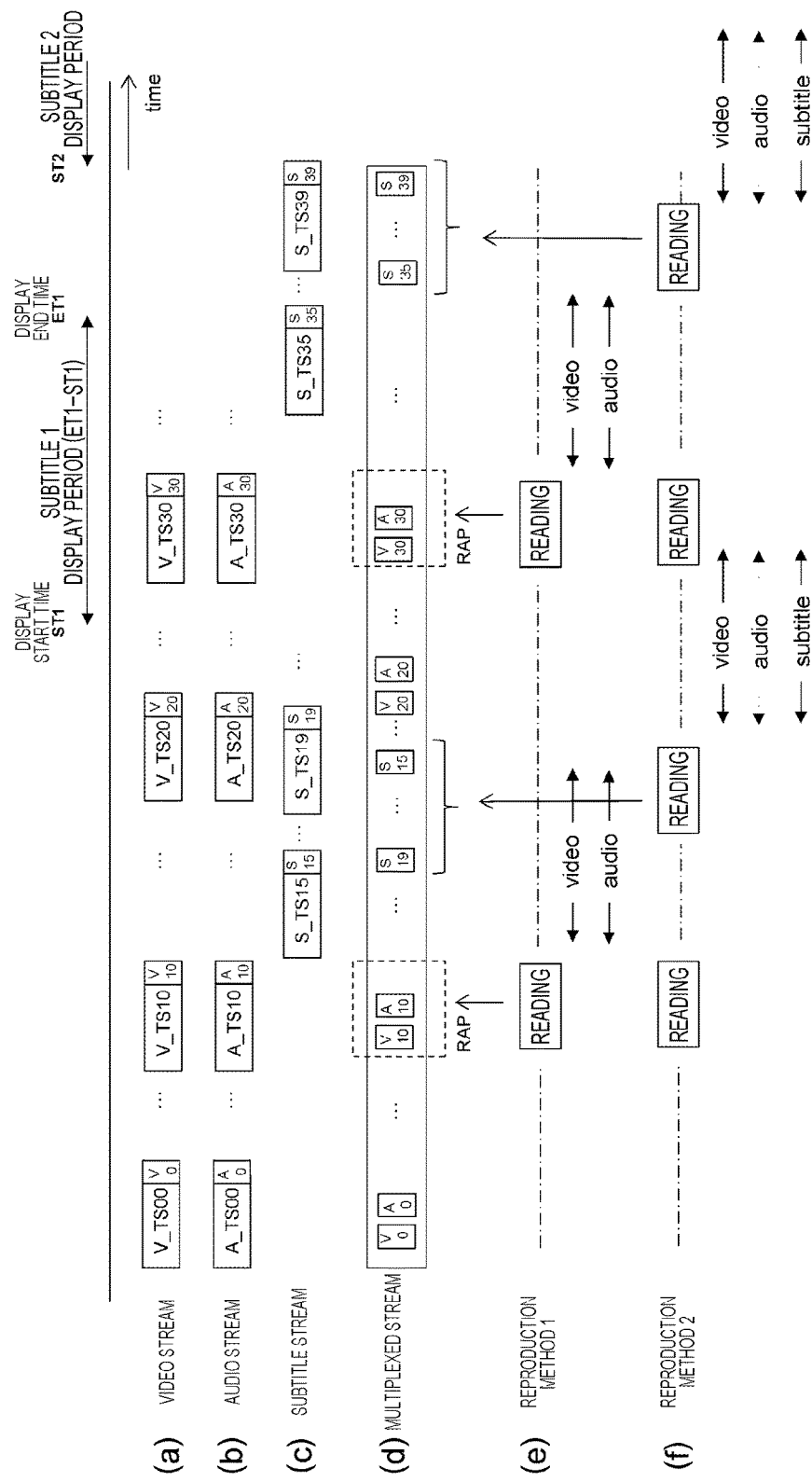
FIGS. 17(a) to 17(f) are diagrams for illustrating conventional multiplexing.

For example, FIGS. 17(a) to 17(f) illustrate conventional multiplexing. FIG. 17(a) illustrates a video PES packet sequence constituting a video stream. Each of "V_TS00", "V_TS10", "V_TS20", "V_TS30" . . . indicates a timestamp inserted into the header, while each of "V0", "V10", "V20", "V30", . . . indicates coded image data arranged in the payload.

FIG. 17(b) illustrates an audio PES packet sequence constituting an audio stream. Each of "A_TS00", "A_TS10", "A_TS20", "A_TS30" . . . indicates a timestamp inserted into the header, while each of "A0", "A10", "A20", "A30", . . . indicates coded sound data arranged in the payload.

FIG. 17(c) illustrates a subtitle PES packet sequence constituting a subtitle stream. Each of "S_TS15", "S_TS19", "S_TS35", "A_TS39", . . . indicates a timestamp inserted into the header, while each of "S15", "S19", "S35", "S39", . . . indicates subtitle information arranged in the payload. A timestamp is inserted into the header of the subtitle PES packet, regardless of the timestamp inserted into the header of each of the video PES packet and the audio PES packet.

FIG. 17(d) illustrates an exemplary arrangement of each of the PES packets in the multiplexed stream (transport stream TS). In multiplexing, the arrangement of each of the PES packets is determined with reference to the timestamp inserted into the header of each of the PES packets. In this case, the subtitle PES packet is arranged at a position slightly before the display period regardless of the PRAP position (random access position).

In the RAP reproduction, for example, as illustrated in reproduction method 1 in FIG. 17(e), decoding processing is performed by reading a PES packet with a certain length for each of RAP positions, leading to image display and sound output. In this case, since the subtitle PES packet is not necessarily arranged at the RAP position, subtitle is not displayed.

Note that in this RAP reproduction, in order to display the subtitle, as illustrated in reproduction method 2 in FIG. 17(f), it is also conceivable that reading of the subtitle PES packet may also be performed in addition to reading the RAP position. In this case, in addition to performing a jump to read the RAP position, it is necessary to repeat a jump to read the subtitle PES packet, and this repetition would complicate the reproduction process. Moreover, since it would be necessary to wait for image display and sound output until completion of reading the subtitle PES packet, image display and sound output might be delayed.

FIGS. 18(a) to 18(e) illustrate multiplexing of the present technology. 18(a) illustrates a video PES packet sequence constituting a video stream. Each of "V_TS00", "V_TS10", "V_TS20", "V_TS30" . . . indicates a timestamp inserted into the header, while each of "V0", "V10", "V20", "V30", . . . indicates coded image data arranged in the payload.

Figure 18:
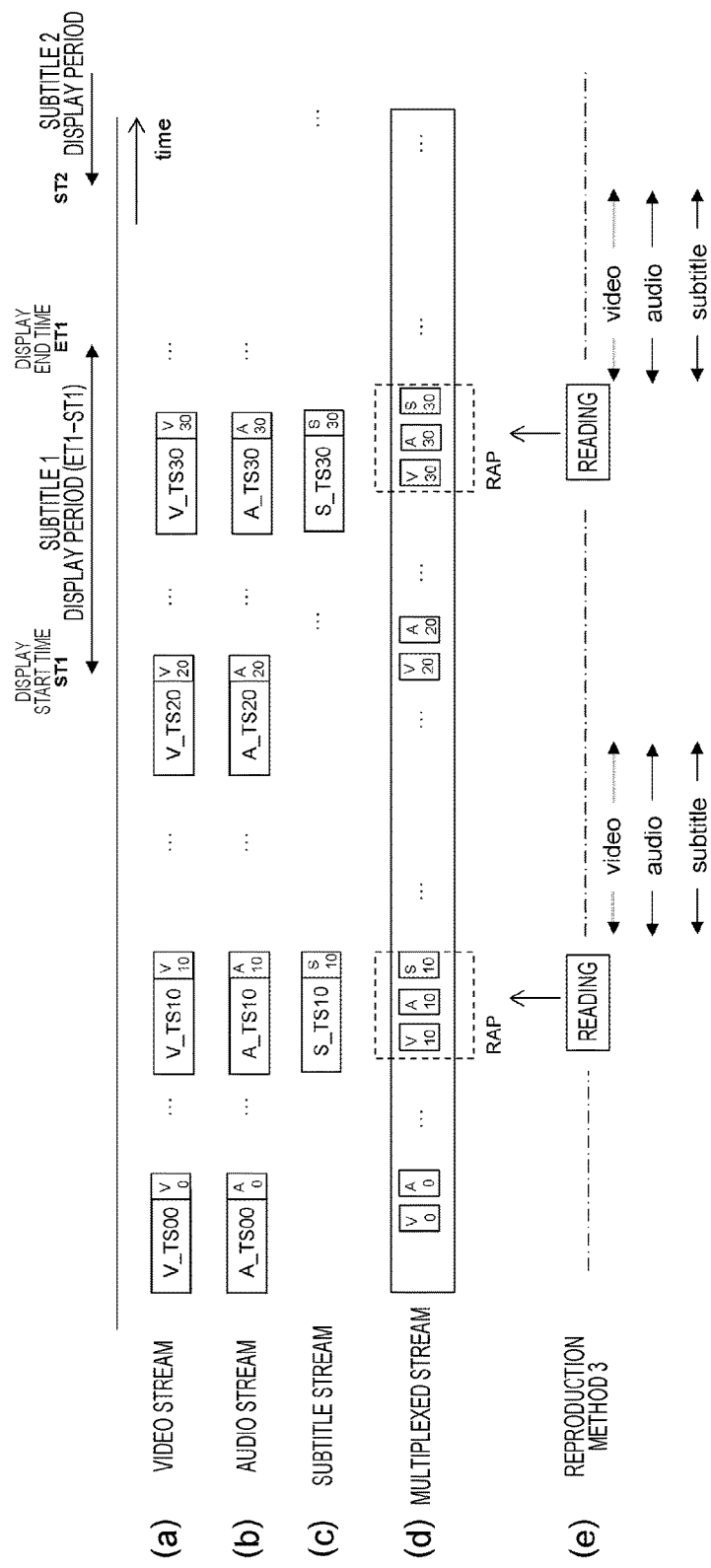
FIGS. 18(a) to 18(e) are diagrams for illustrating multiplexing according to the present technology.

FIG. 18(b) illustrates an audio PES packet sequence constituting an audio stream. Each of "A_TS00", "A_TS10", "A_TS20", "A_TS30", . . . indicates a timestamp inserted into the headers, while each of "A0", "A10", "A20", "A30", . . . indicates coded image data arranged in the payload.

FIG. 18(c) illustrates a subtitle PES packet sequence constituting a subtitle stream. Each of "S_TS10", "S_TS30", . . . indicates a timestamp inserted into the header, while each of "S10", "S130", . . . indicates subtitle information arranged in the payload. A timestamp (first timestamp) having a value equal to or close to the value of the timestamp inserted into the header of the video PES packet as a target of RAP is inserted into the header of the subtitle PES packet.

FIG. 18(d) illustrates an exemplary arrangement of each of the PES packets in the multiplexed stream (transport stream TS). In multiplexing, the arrangement of each of the PES packets is determined with reference to the timestamp inserted into the header of each of the PES packets. In this case, the subtitle PES packet is arranged at the PAP position (random access position) similarly to the cases of the video PES packet and the audio PES packet, as a target of RAP.

In RAP reproduction, as illustrated in reproduction method 3 in FIG. 18(e), for example, the PES packet is read with a certain length for each of RAP positions and decoding processing is performed. In this case, the subtitle PES packet is read and undergoes decoding processing together with the video PES packet and the audio PES packet, and this enables subtitle display to be performed properly together with image display and sound output.

In this manner, by performing multiplexing as described in the present technology, there is no need to repeat the jump needed to read the subtitle PES packet, other than the jump for reading the PRAP position as in the reproduction method 2 illustrated in FIG. 17(f), making it possible to achieve simplification of the variable speed reproducing processing on the receiving side, performed to enable the subtitle display.

Moreover, in the transmission-reception system 10 illustrated in FIG. 1, the second timestamp (unique timestamp) indicating the display time of the subtitle is inserted into one of the header and the payload of the subtitle PES packet. With this configuration, the receiving side can easily control the display timing of the subtitle on the basis of the unique timestamp.

Moreover, the transmission-reception system 10 illustrated in FIG. 1 inserts identification information indicating that the unique timestamp has been inserted into the subtitle PES packet, into the transport stream TS. With this configuration, the receiving side can easily recognize that the unique timestamp has been inserted on the basis of the identification information and can efficiently extract the unique timestamp.

2. Modification Example

Note that the above-described embodiment illustrates an exemplary case of using TTML as text information of the subtitle of a predetermined format having display timing information. The present technology, however, is not limited to this, and it is conceivable to use other timed text information having information equivalent to TTML. For example, a derived format of TTML may be used. Moreover, in the present technology, the bitmap format of the conventional type can be naturally applied as the subtitle in a completely similar manner.

Moreover, while the above-described embodiment illustrates a case where the transmission-reception system 10 includes the broadcast delivery system 100 and the television receiver 200, the configuration of the transmission-reception system to which the present technology can be applied is not limited to this. For example, it is allowable to have a configuration including a set top box and a monitor being connected with a digital interface such as a high-definition multimedia interface (HDMI) used as the portion of the television receiver 200. Note that "HDMI" is a registered trademark.

Moreover, the present technology may also be configured as below.

(1) A transmission apparatus including:
a video encoding unit that generates a video stream formed with a video packet having coded image data in a payload;
a subtitle encoding unit that generates a subtitle stream formed with a subtitle packet having subtitle information in a payload;
a multiplexed stream generation unit that generates a multiplexed stream including the video stream and the subtitle stream; and
a transmission unit that transmits the multiplexed stream,
in which the multiplexed stream generation unit arranges the subtitle packet at a random access position.

(2) The transmission apparatus according to (1),
in which the subtitle encoding unit inserts a timestamp having a value equal to or close to a value of a timestamp inserted into a timestamp insertion position of a header of the video packet at the random access position, into a timestamp insertion position of a header of the subtitle packet.

(3) The transmission apparatus according to (2), in which the subtitle encoding unit inserts a unique timestamp indicating a display time of a subtitle into one of the header and a payload of the subtitle packet.

(4) The transmission apparatus according to (3),
in which the multiplexed stream generation unit inserts identification information indicating that the unique timestamp has been inserted into the subtitle packet, into the multiplexed stream.

(5) The transmission apparatus according to (4),
in which information indicating an insertion position is added to the identification information.

(6) The transmission apparatus according to any one of (1) to (5),
in which the subtitle information is text information of a subtitle of a predetermined format having display timing information.

(7) The transmission apparatus according to (6),
in which the text information of the subtitle of the predetermined format is one of TTML and a derived format of the TTML.

(8) The transmission apparatus according to any one of (1) to (7),
in which each of the video packet and the subtitle packet is a PES packet, and
the multiplexed stream is an MPEG2 transport stream.

(9) A transmission method including:
a video encoding step of generating a video stream formed with a video packet having coded image data in a payload;
a subtitle stream generation step of generating a subtitle stream formed with a subtitle packet having subtitle information in a payload;
a multiplexed stream generation step of generating a multiplexed stream including the video stream and the subtitle stream; and
a transmission step of transmitting the multiplexed stream by a transmission unit,
in which the multiplexed stream generation step arranges the subtitle packet at a random access position.

(10) A reception apparatus including a reception unit that receives a multiplexed stream including a video stream formed with a video packet having coded image data in a payload and including a subtitle stream formed with a subtitle packet having subtitle information in a payload,
the subtitle packet being arranged at a random access position in the multiplexed stream,
the reception apparatus further including a processing unit that extracts the subtitle packet from the multiplexed stream together with the video packet at the random access position and that performs subtitle display processing.

(11) The reception apparatus according to (10),
in which a first timestamp having a value equal to or close to a value as a value of a timestamp inserted into a timestamp insertion position of a header of the video packet at the random access position, is inserted into a timestamp insertion position of the header of the subtitle packet,
a second timestamp indicating a display time of the subtitle is inserted into one of the header and the payload of the subtitle packet, and
the processing unit performs, in a normal reproduction mode, subtitle display processing with reference to the second timestamp.

(12) The reception apparatus according to (11),
in which identification information indicating that the second timestamp has been inserted into the subtitle packet is inserted into the multiplexed stream, and the processing unit extracts the second timestamp from the subtitle packet on the basis of the identification information and uses the second timestamp.

(13) A reception method including a reception step of receiving, by a reception unit, a multiplexed stream including a video stream formed with a video packet having coded image data in a payload and including a subtitle stream formed with a subtitle packet having subtitle information in the payload, the subtitle packet being arranged at a random access position in the multiplexed stream, the reception method further including a processing step of retrieving the subtitle packet from the multiplexed stream together with the video packet at the random access position and performing subtitle display processing.

The main feature of the present technology is to achieve simplifying the subtitle display processing in the variable speed reproduction mode on the receiving side by arranging the subtitle PES packet at the random access position in generating the transport stream TS as a multiplexed stream (refer to FIGS. 18(a) to 18(e)).

REFERENCE SIGNS LIST 10 transmission-reception system
100 broadcast delivery system
110 stream generation unit
111 control unit
112 video encoder
113 audio encoder
114 text format converter
115 subtitle encoder
116 TS formatter (multiplexer)
120 timing management unit
121 video timing management unit
122 audio timing management unit
123 RAP timing management unit
124 subtitle display timing management unit
200 television receiver
201 reception unit
201a storage medium
202 TS analysis unit
203 video decoder
204 video superimposing unit
205 panel drive circuit
206 display panel
207 audio decoder
208 sound output circuit
209 speaker
210 subtitle decoder
221 CPU

The invention claimed is:

1. A transmission apparatus comprising:
a video encoder that generates a video stream formed with a video packet having coded image data in a payload;
a subtitle encoder that generates a subtitle stream formed with a subtitle packet having subtitle information in a payload;
a multiplexer that generates a multiplexed stream including the video stream and the subtitle stream; and
a transmission device that transmits the multiplexed stream,
wherein the subtitle encoder is configured to
obtain a timestamp from the video packet as a target timestamp of a random access position,
obtain a subtitle timestamp on a basis of the target timestamp,
perform accuracy conversion on a stored subtitle start time, and
insert the subtitle timestamp and a converted timestamp resulting from the accuracy conversion into a timestamp insertion position of a header of the subtitle packet, and
wherein the multiplexer arranges the subtitle packet at a random access position, on the basis of the subtitle timestamp.

2. The transmission apparatus according to claim 1, wherein the subtitle encoder inserts the converted timestamp as a unique timestamp indicating a display time of a subtitle into one of the header and a payload of the subtitle packet.

3. The transmission apparatus according to claim 2, wherein the multiplexer inserts identification information indicating that the unique timestamp has been inserted into the subtitle packet, into the multiplexed stream.

4. The transmission apparatus according to claim 3, wherein information indicating an insertion position is added to the identification information.

5. The transmission apparatus according to claim 1, wherein the subtitle information is text information of a subtitle of a predetermined format having display timing information.

6. The transmission apparatus according to claim 5, wherein the text information of the subtitle of the predetermined format is one of Timed Text Markup Language (TTML) and a derived format of the TTML.

7. The transmission apparatus according to claim 1, wherein each of the video packet and the subtitle packet is a PES packet, and
the multiplexed stream is an MPEG2 transport stream.

8. A transmission method comprising:
generating, by a video encoder, a video stream formed with a video packet having coded image data in a payload;
generating, by a subtitle encoder, a subtitle stream formed with a subtitle packet having subtitle information in a payload;
generating, by a multiplexer, a multiplexed stream including the video stream and the subtitle stream; and
transmitting, by a transmission device, the multiplexed stream by a transmission unit,
wherein the subtitle encoder is configured to
obtain a timestamp from the video packet as a target timestamp of a random access position,
obtains a subtitle timestamp on a basis of the target timestamp,
perform accuracy conversion on a stored subtitle start time, and
insert the subtitle timestamp and a converted timestamp resulting from the accuracy conversion into a timestamp insertion position of a header of the subtitle packet,
wherein the multiplexer arranges the subtitle packet at a random access position, on the basis of the subtitle timestamp.

9. A reception apparatus comprising a receiver that receives a multiplexed stream including a video stream formed with a video packet having coded image data in a payload and including a subtitle stream formed with a subtitle packet having subtitle information in a payload,
the subtitle packet being arranged at a random access position in the received multiplexed stream, wherein the random access position is based on a target timestamp obtained from the video packet of the video stream, the reception apparatus further comprising processing circuitry that retrieves the subtitle packet from the multiplexed stream together with the video packet at the random access position and that performs subtitle display processing.

10. The reception apparatus according to claim 9,
wherein the converted timestamp having a value equal to or close to a value as a value of a timestamp inserted into a timestamp insertion position of a header of the video packet at the random access position, is inserted into a timestamp insertion position of the header of the subtitle packet, a second timestamp indicating a display time of the subtitle is inserted into one of the header and the payload of the subtitle packet, and the processing circuitry performs, in a normal reproduction mode, subtitle display processing with reference to the second timestamp.

11. The reception apparatus according to claim 10,
wherein identification information indicating that the second timestamp has been inserted into the subtitle packet is inserted into the multiplexed stream, and the processing circuitry extracts the second timestamp from the subtitle packet on the basis of the identification information and uses the second timestamp.

12. A reception method comprising a reception step of receiving, by a receiver, a multiplexed stream including a video stream formed with a video packet having coded image data in a payload and including a subtitle stream formed with a subtitle packet having subtitle information in a payload, the subtitle packet being arranged at a random access position in the multiplexed stream, wherein the random access position is based on a target timestamp obtained from the video packet of the video stream, the reception method further comprising retrieving the subtitle packet from the multiplexed stream together with the video packet at the random access position and performing subtitle display processing by processing circuitry.

\* \* \* \* \*